(12) United States Patent
Bots et al.

(10) Patent No.: US 12,054,291 B2
(45) Date of Patent: Aug. 6, 2024

(54) DEFORMABLE SHIM AND MOUNTING ARRANGEMENT

(71) Applicant: Airbus Operations GmbH, Hamburg (DE)

(72) Inventors: Mika Bots, Breda (NL); Matthias Hegenbart, Ahlerstedt (DE); Hermann Benthien, Sottrum (DE)

(73) Assignee: Airbus Operations GmbH, Hamburg (DE)

( * ) Notice: Subject to any disclaimer, the term of this patent is extended or adjusted under 35 U.S.C. 154(b) by 311 days.

(21) Appl. No.: 17/454,115

(22) Filed: Nov. 9, 2021

(65) Prior Publication Data

US 2022/0055771 A1   Feb. 24, 2022

Related U.S. Application Data

(62) Division of application No. 15/879,642, filed on Jan. 25, 2018, now Pat. No. 11,198,521.

(30) Foreign Application Priority Data

Jan. 26, 2017   (DE) .......................... 102017101531.0

(51) Int. Cl.
*B64F 5/10*   (2017.01)
*B23P 19/02*   (2006.01)
(Continued)

(52) U.S. Cl.
CPC ............... *B64F 5/10* (2017.01); *B23P 19/02* (2013.01); *B23P 19/04* (2013.01); *B29C 65/565* (2013.01); *B29C 65/7823* (2013.01); *B64C 1/069* (2013.01); *B23P 2700/01* (2013.01); *B64C 1/14* (2013.01)

(58) Field of Classification Search
CPC .. B64F 5/10; B23P 19/02; B23P 19/04; B23P 2700/01; B29C 65/565; B29C 65/7823; B64C 1/069; B64C 1/14
See application file for complete search history.

(56) References Cited

U.S. PATENT DOCUMENTS

| 4,338,353 | A | 7/1982 | Melchior |
| 4,977,018 | A | 12/1990 | Irrgeher et al. |

(Continued)

FOREIGN PATENT DOCUMENTS

| DE | 102007061804 | 7/2009 |
| DE | 102013102812 | 9/2014 |

OTHER PUBLICATIONS

German Search Report, Jul. 25, 2017, priority document.

*Primary Examiner* — George R Koch
(74) *Attorney, Agent, or Firm* — Greer, Burns & Crain, Ltd.

(57) ABSTRACT

A method of providing a deformable shim that comprises a main structure of an at least partly cellular region. The main structure is compressible by plastic deformation from an initial volume to a deformed volume, wherein the deformed volume is smaller than the initial volume. In a deformed state, the main structure maintains the deformed volume without further or continuing compression force. Further, the main structure is arrangeable between a first aircraft component and a second aircraft component to create a predefined distance between the first and the second aircraft component.

17 Claims, 1 Drawing Sheet

(51) Int. Cl.
     *B23P 19/04*     (2006.01)
     *B29C 65/56*     (2006.01)
     *B29C 65/78*     (2006.01)
     *B64C 1/06*     (2006.01)
     *B64C 1/14*     (2006.01)

(56) References Cited

U.S. PATENT DOCUMENTS

| | | |
|---|---|---|
| 10,253,497 B2 | 4/2019 | Clancy et al. |
| 2006/0125291 A1 | 6/2006 | Buravalla et al. |
| 2006/0192342 A1 | 8/2006 | West |
| 2010/0276065 A1* | 11/2010 | Blanchard ............... B29C 73/24 |
| | | 428/343 |
| 2010/0320322 A1 | 12/2010 | Reye et al. |
| 2011/0028061 A1* | 2/2011 | Sanderson ........ B29C 66/73756 |
| | | 428/221 |
| 2014/0286691 A1 | 9/2014 | Gleine |
| 2016/0176085 A1 | 6/2016 | Brok et al. |

* cited by examiner

DEFORMABLE SHIM AND MOUNTING ARRANGEMENT

CROSS-REFERENCES TO RELATED APPLICATIONS

This application is a divisional of U.S. patent application Ser. No. 15/879,642 filed on Jan. 25, 2018, now U.S. Pat. No. 11,198,521 B2, which claims the benefit of the German patent application No. 10 2017 101 531.0 filed on Jan. 26, 2017, the entire disclosures of which are incorporated herein by way of reference.

FIELD OF THE INVENTION

The present invention relates to a shim, and relates, in particular, to a deformable shim, a mounting arrangement for mounting two components and a method for generating a predefined distance between a first and a second aircraft component.

BACKGROUND OF THE INVENTION

Shimming is a process used during the assembly of two parts fastened together, for example to correct potential shape and/or surface finish defects (that may be linked, for example, to manufacturing tolerances) Shimming aims to take up clearances between them and ensure optimal quality of bearing surfaces. As an example, two types of shims are used. One type is a liquid shim, for example, that is based on epoxy resin molded between two parts. Liquid shimming can also help preserve water or fuel tightness properties off assembly in combination with a sealant. Another type is a solid shim that may be used in combination with a liquid shim. However, shimming has been shown to mean separate steps during manufacturing, for example, for complex aircraft components and large aircraft structures.

SUMMARY OF THE INVENTION

There may, hence, be a need to further improve and facilitate shimming between two parts.

It should be noted that the following described aspects of the invention apply also for the deformable shim, the mounting arrangement for mounting two components and the method for generating a predefined distance between a first and a second aircraft component.

According to the present invention, a deformable shim is provided. The deformable shim comprises a main structure of an at least partly cellular region. The main structure is compressible by plastic deformation from an initial volume to a deformed volume, wherein the deformed volume is smaller than the initial volume. In a deformed state, the main structure maintains the deformed volume without a further or continuing compression force and is arrangeable between a first aircraft component and a second aircraft component to create a predefined distance between the first and the second aircraft component.

The term "shim" refers to a constructive element that can be arranged between two (or more) adjacent or connected components in order to adjust or compensate or balance or equal varying distances of the two (or more) components.

The term "deformable" refers to changing the outer dimensions of the shim by more than a neglectable amount.

The term "plastic deformation" refers to a constant change of the form or size, which change stays when the deformation generating force is no longer present.

For example, shimming is performed to correct variations in the mounting distances that may be linked to manufacturing processes. As an example, the defects are divided in three categories: surface roughness, geometrical defects and assembly gaps.

Manufacturing processes may also cause geometrical variations. It can be angle variations, for example, "springback" effect in composite manufacturing, curve distortion in machined and straightened parts or caused by the forming process of composite parts. The deformable shim at least partly compensates such variations.

In an example, in the cellular region the main structure is provided as a cellular solid.

The term "cellular solid" refers to a structure that comprises a plurality of recesses or cavities or other types of small hollow portions arranged within a plurality of structure material portions. The cellular solid may be produced by additive manufacturing.

For example, the cellular solid comprises a sponge material.

For example, the cellular solid comprises a foam material.

For example, the cellular solid comprises porous lattice structures.

In an example, the cellular solid comprises an arrangement of nodes which are connected by ligaments or bar- or band-like members that surround and enclose cells.

In another example, the cellular solid comprises open and/or closed-cell types of recesses.

In an example, open-cell types of recesses are provided as foams in which the ligaments are not connected to each other except for the node points such that at least a part of the pores is in fluid contact with each other.

In another example, closed-cell foams have faces that connect ligaments resulting in a plurality of hollow, enclosed pores that do not stay in fluid contact with each other.

The dimensions of the cellular solid are larger than a required tolerance between a first and a second part.

In an example, a lattice structure shows a crushable behavior and the cellular solid is provided as a porous and lightweight structure material.

According to an example, a filler material is infiltratable in the main structure to increase the stiffness of the shim.

In an example, the filler material is provided as an adhesive added to the main structure.

In another example, the filler material is provided as a hardening substance, for example for stiffening a foam structure, and the hardening substance is activated to harden upon the targeted deformation.

As an example, the filler material is provided as resin.

The filler material can be injected into the main structure. In an example, the main structure is provided as a lattice or porous structure designed for passive flow of the filler material through capillary action.

In an example, the filler material is infiltrated in the main structure before compression.

In another example, the filler material is infiltrated in the main structure of the deformable shim after compression.

According to an example, the main structure is provided with an outer interface layer to create mechanical interlocking.

The shim can have an interface layer that has specific properties. For example, an adhesive film can secure both parts together in secondary bonding. In another example, a Velcro-type tape can be applied to all surfaces to create a strong bond, which can be strengthened with adhesive, if necessary. This is also applicable as a repair strategy.

According to an example, the outer interface layer comprises prepregs to create co-bonding between one of the components and the shim.

This could also be applicable as a repair strategy.

In an example, the main structure comprises a characteristic stress-strain curve comprising a first region as a linear-elastic region, a second region as a plateau region where all the cells collapse; and a third region that is a densification region.

According to the invention, also a mounting arrangement for mounting two components is provided. The mounting arrangement comprises a first component, a second component and a deformable shim. The deformable shim is provided between the first and the second component. Due to the deformable shim, a predefined space between the first part and the second part is generated.

The term "mounting arrangement" can also be referred to as "connecting arrangement."

The first and second components can also be referred to as first and second parts.

In an example, a spacer is arrangeable between the deformable shim and the first or second part to generate a predefined gap.

According to the invention, also a method for generating a predefined distance between a first and a second aircraft component is provided. The method comprises the following steps:

a) Providing a deformable shim in an initial volume. The deformable shim comprises a main structure of an at least partly cellular region the main structure is compressible by plastic deformation from an initial volume to a deformed volume, wherein the deformed volume is smaller than the initial volume. In a deformed state, the main structure maintains the deformed volume without a further or continuing compression force. Further, the main structure is arrangeable between a first aircraft component and a second aircraft component to create a predefined distance between the first and the second aircraft component; and b) Compressing the deformable shim from the initial volume to a deformed volume. The deformed volume is smaller than the initial volume; and the deformed volume enables the creation of a predefined distance between a first and a second aircraft component.

According to an example, a first and a second aircraft component are provided and the compressing step is provided in situ with the deformable shim arranged between the first and the second aircraft component.

According to an example, in step b), a spacer is provided to generate a resulting predefined gap between the first component and the second component.

The space is removable afterwards to provide the desired gap. The spacer can have any shape to allow any shape of gap. This is a benefit compared to liquid shims which are now the industry standard which bond surfaces together.

In an example, the method does not necessarily bond the surfaces (by making the upper and bottom surface solid), the spacer can be used to create a defined gap.

According to the invention, also the use of a shim for adjusting a distance between a first and second aircraft component is provided.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF THE PREFERRED EMBODIMENTS

Figure 1A:
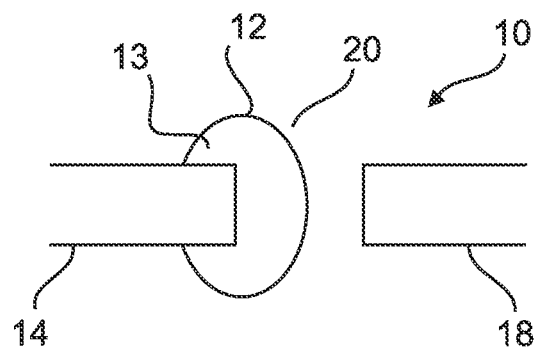
FIGS. 1a and 1b show a schematic view of an example of a mounting arrangement with a deformable shim.
Figure 1B:
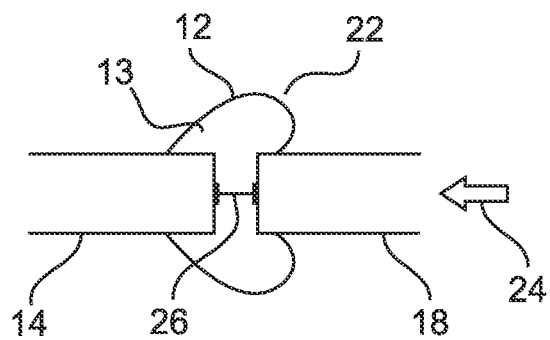

FIG. 1a and FIG. 1b show a deformable shim 12, arranged in a mounting arrangement 10 for mounting a first component 14 and a second component 18. The deformable shim 12 comprises a main structure 13 of an at least partly cellular region. The main structure 13 is compressible by plastic deformation with a compression force 24 from an initial volume 20 (FIG. 1a) to a deformed volume 22 (FIG. 1b).

The deformed volume 22 enables the creation of a predefined distance 26 between a first component 14 and a second component 18.

In another example, not shown, the shim 12 can be provided without the surrounding components. It is noted that the first and second component 14, 18 are shown as an option in FIG. 1a and FIG. 1b.

The term "shim" refers to a constructive element that can be arranged between two (or more) adjacent or connected components in order to adjust or compensate or balance or equal varying distances of the two (or more) components.

Figure 2:
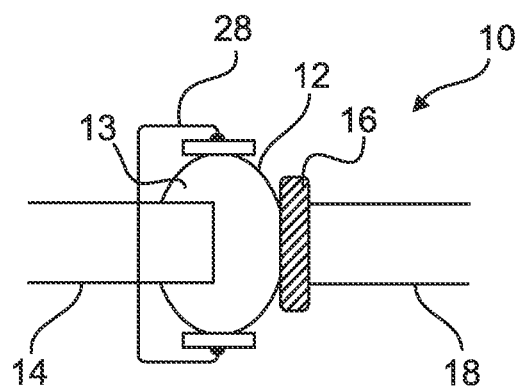
FIG. 2 shows a schematic view of an example of a mounting arrangement with a deformable shim with a spacer.

FIG. 2 shows another example of the mounting arrangement 10. Additionally, a spacer 16 is provided, which is shown as an option. To keep the shim 12 in form during the compression, a (removable) clamp 28 may be provided. After removing the spacer, the shim stays in the deformed shape due to plastic deformation and a predefined gap is generated.

In another option, although not shown, a filler material is infiltratable in the main structure 13 to increase the stiffness of the shim 12.

In a further option, also not shown, the deformable shim 12 has an interface layer that has specific properties. For example, an adhesive film can secure both parts 14, 18 together in a secondary bonding. This is also applicable as a repair strategy.

Figure 3:
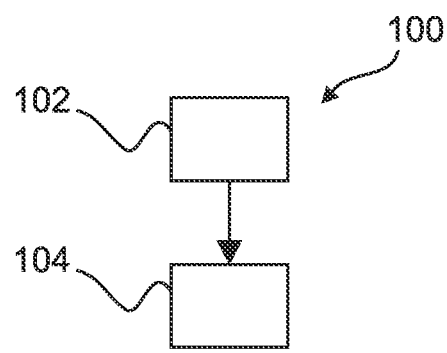
FIG. 3 shows an example of a method for generating a predefined distance between a first and a second component.

FIG. 3 shows an example of a method 100 for generating a predefined distance 26 between a first component 14 and a second component 18. The method 100 comprises the following steps:

In a first step 102, also referred to as step a), a deformable shim 12 is provided in an initial volume 20. The deformable shim 12 comprises a main structure 13 of an at least partly cellular region. The main structure 13 is compressible by plastic deformation from an initial volume 20 to a deformed volume 22; the deformed volume 22 being smaller than the initial volume 20. In a deformed state, the main structure 13 maintains the deformed volume 22 without a continuation of the compression force 24. The main structure 13 is arrangeable between a first component 14 and a second component 18 to create a predefined distance 26 between the first component 14 and the second component 18.

In a second step 104, also referred to as step b), the deformable shim 12 is compressed from the initial volume 20 to a deformed volume 22. The deformed volume 22 is smaller than the initial volume 20. The deformed volume 22 the creation of a predefined distance 26 between the first component 14 and the second component 18.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter, also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single device or other unit may fulfil the functions of several items re-cited in the claims. The mere fact that certain measures are re-cited in mutually different dependent claims does not indicate that a combination of these measures cannot be used to advantage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for generating a predefined distance between a first and a second aircraft component, comprising the following steps:
   a) providing a deformable shim in an initial volume;
   wherein the deformable shim comprises a main structure of an at least partly cellular region;
   wherein the main structure is compressible by plastic deformation from an initial volume to a deformed volume, wherein the deformed volume is smaller than the initial volume;
   wherein in a deformed state, the main structure maintains the deformed volume without a continuing compression force; and
   wherein the main structure is arrangeable between the first aircraft component and the second aircraft component to create the predefined distance between the first and the second aircraft component; and
   b) compressing the deformable shim from the initial volume to the deformed volume;
   wherein the deformed volume is smaller than the initial volume;
   wherein the deformed volume enables the creation of the predefined distance between a first and a second aircraft component;
   wherein the deformable shim further comprises a filler material infiltratable in the main structure to increase a stiffness of the shim; and
   wherein the filler material is infiltrated in the main structure after the step of compressing the deformable shim.

2. The method according to claim 1, wherein the first and the second aircraft component are provided and the compressing step is provided in situ with the deformable shim arranged between the first and the second aircraft component.

3. The method according to claim 1, wherein in step b), a spacer is provided to generate a resulting predefined gap between the first component and the second component.

4. The method according to claim 3, wherein a clamp keeps the shim in form during the step of compressing the deformable shim.

5. The method according to claim 1, wherein the deformable shim further comprises an outer interface layer on the main structure to create mechanical interlocking.

6. The method according to claim 5, wherein the outer interface layer comprises prepregs to create co-bonding between one of the components and the shim.

7. The method according to claim 1, wherein the at least partly cellular region of the main structure is a cellular solid.

8. The method according to claim 7, wherein the cellular solid comprises at least one of: a sponge material, a foam material and porous lattice structures.

9. The method according to claim 7, wherein the cellular solid comprises an arrangement of nodes which are connected by ligaments that surround and enclose cells of the cellular solid.

10. The method according to claim 7, wherein the cellular solid comprises at least one of: open-cell type recesses and closed-cell types of recesses.

11. The method according to claim 7, wherein the at least partly cellular region of the main structure is a cellular solid, and wherein the cellular solid comprises an arrangement of nodes which are connected by ligaments that surround and enclose cells of the cellular solid.

12. The method according to claim 1, wherein the main structure is provided as a lattice or porous structure designed for passive flow of the filler material through capillary action.

13. A method for generating a predefined distance between a first and a second aircraft component, comprising the following steps:
   a) providing a deformable shim in an initial volume;
   wherein the deformable shim comprises a main structure of an at least partly cellular region;
   wherein the at least partly cellular region of the main structure is a cellular solid, which has closed-cell recesses;
   wherein the main structure is compressible by plastic deformation from an initial volume to a deformed volume, wherein the deformed volume is smaller than the initial volume;
   wherein in a deformed state, the main structure maintains the deformed volume without a continuing compression force; and
   wherein the main structure is arrangeable between the first aircraft component and the second aircraft component to create the predefined distance between the first and the second aircraft component; and b) compressing the deformable shim from the initial volume to the deformed volume;

wherein the deformed volume is smaller than the initial volume; and wherein the deformed volume enables the creation of the predefined distance between a first and a second aircraft component.

14. The method according to claim 13, wherein the deformable shim further comprises a filler material infiltratable in the main structure to increase a stiffness of the shim, and wherein the filler material is infiltrated in the main structure after the step of compressing the deformable shim.

15. The method according to claim 13, wherein in step b), a spacer is provided to generate a resulting predefined gap between the first component and the second component, and wherein a clamp keeps the shim in form during the step of compressing the deformable shim.

16. The method according to claim 13, wherein the deformable shim further comprises an outer interface layer on the main structure to create mechanical interlocking.

17. The method according to claim 16, wherein the outer interface layer comprises prepregs to create co-bonding between one of the components and the shim.

\* \* \* \* \*